United States Patent
Sheng et al.

(10) Patent No.: US 6,753,982 B1
(45) Date of Patent: Jun. 22, 2004

(54) SCANNER WITH AUTOMATIC EDGE DETECTION

(75) Inventors: Thomas Sheng, Hsinchu (TW); Michael Chen, Hsinchu (TW)

(73) Assignee: Avision Inc., Hsinchu (TW)

( * ) Notice: Subject to any disclaimer, the term of this patent is extended or adjusted under 35 U.S.C. 154(b) by 627 days.

(21) Appl. No.: 09/642,046

(22) Filed: Aug. 18, 2000

(30) Foreign Application Priority Data

Jan. 10, 2000 (TW) .......................................... 89100266 A (51) Int. Cl.[7] .......................... G01N 21/86; H04N 1/04
(52) U.S. Cl. ........................ 358/474; 358/488; 358/497; 250/559.36; 250/559.19
(58) Field of Search ............................... 358/488, 474, 358/497, 475; 399/376; 356/71, 625; 355/74; 250/200, 559.36, 559.01, 559.06, 559.19

(56) References Cited

U.S. PATENT DOCUMENTS

| | | | | |
|---|---|---|---|---|
| 4,647,961 A | * | 3/1987 | Kammoto et al. | ........... 358/516 |
| 5,541,713 A | * | 7/1996 | Takatsuki et al. | ........... 399/376 |
| 5,729,024 A | * | 3/1998 | Baba et al. | ............ 250/559.36 |
| 5,818,062 A | * | 10/1998 | Baba et al. | ............ 250/559.36 |
| 5,917,616 A | * | 6/1999 | Chou et al. | ................. 358/488 |

\* cited by examiner

Primary Examiner—Edward Coles
Assistant Examiner—Jason Sherrill
(74) Attorney, Agent, or Firm—Ladas & Parry (57) ABSTRACT

An improved scanner with automatic edge detection capable of quickly, accurately, and readily detecting the edges of a document or an object to be scanned. Said scanner with automatic edge detection comprises a main body, a scanning module, and an edge detector. The main body comprises a flat glass platform for supporting an object. The scanning module is installed inside the main body for scanning the image of an object placed on the flat glass platform of the scanner. The edge detector is located inside the main body to detect the edges of the object, thereby determining the size of the object before scanning. The scanner according to the present invention is capable of obtaining the correct size of the object being scanned without restricting the size of the object to match any of the fixed paper sizes in order for such scanner function as auto zooming to proceed successfully. In addition, through a microprocessor and a properly embedded computer program of a disclosed art, the scanner according to the present invention is capable of auto zooming on the scanned object without the assistance of a computer and a monitor.

10 Claims, 7 Drawing Sheets

SCANNER WITH AUTOMATIC EDGE DETECTION

BACKGROUND OF THE INVENTION

1. Field of the Invention

The present invention generally relates to a scanner with an automatic edge detection capability; more specifically, the present invention relates to a scanner capable of quickly, accurately, and readily detecting the edges of a document or an object to be scanned.

2. Description of the Related Art

As a gift of the modern technology, the scanner has become one of the most important image-inputting devices used by today's offices. Before the detailed image of a document or an object disposed on the flat glass platform of a conventional scanner is scanned, a pre-scan function is typically incorporated to quickly gather crude information about the object being scanned as disclosed in the U.S. Pat. No. 4,837,635. In other words, the pre-scan function typically produces a low-resolution scanning image displayable on a computer monitor before a more complete image of the object is meticulously scanned. Such pre-scan function of a scanner typically provides a previewing picture and thereby offering a choice to the user for defining a specific region of the object to be scanned zoomed, or processed by other special functions.

Nevertheless, a user executing the aforementioned pre-scan function relies heavily on the processing power of an externally linked computer and monitor such that only an experienced computer user can perform the subsequent zooming or cropping operations manually via a pointing device for accurately defining the boundaries of the object being scanned. For example, as to the ordinary activities of fitting different sizes of zoomed or reduced images to various fixed paper sizes, such as zooming an image from size A3 to size B5, a costly high-end computer system calling for a series of inconvenient manual operations is typically required to accurately produce a zoom image of true size. In particular, although many conventional scanners claim only a very short lapse of time is needed for each pre-scan function to be completed, but in fact the time required for the scanning module in a scanner to obtain a rough image of an object, relative to the overall scanning operation, is very considerable. Namely, an object disposed on a flat glass platform of the scanner is quickly scanned in a line-by-line fashion such that each line of the scanned image is sequentially generated by varying the charges in the charged couple devices (CCDs) of the scanning module. Moreover, the charges in the CCDs must be completely removed after each time a line of the scanned image is sequentially outputted to make the CCDs available for scanning the next line, which can be very time-consuming. Although an A3-size scanner is becoming a standard equipment in a modern office, the scanning rate of the conventional scanner is still considered inadequate for normal office operations. Especially when said scanner is operated side-by-side with a latest Xerox-type copying machine used strictly or photocopying purposes, it is only more obvious that said scanner will never catch up with said copying machine in speed. Although a scanner, unlike a photocopier, is an equipment used for digitizing document information to be further processed by a computer in graphic forms, it is still nonetheless an important issue for the scanner manufacturers to provide scanners equipped with such time-saving functions as auto zooming and edge detection.

In fact, if the edges of an object to be scanned can be automatically detected by the scanner, the issue of the auto zooming can be overcome without even considering the image of the object itself.

Among the assorted image processing devices, some of the latest photocopiers have already been known to possess the ability for edge detection, which can automatically detect a number of fixed paper sizes. Nonetheless, the edge-detecting operation of the photocopier is different from that of a scanner, described in paragraphs that follow, according to the present invention. A conventional photocopier with the function of auto zooming, for example, typically comprises a plurality of edge detectors each located at a pre-determined fixed positions under the flat glass platform that corresponds to a specific paper size. Furthermore, the photocopier may have two edge detectors, namely a detector A4 and a detector B5 respectively located under the corresponding borders of A4-size and B5-size zones. Accordingly, if the detector A4 detects that an object or a document is occupying the pre-defined edges of the A4 size zone, the object or the document on the flat glass platform is then determined by the photocopier to be that of the A4 size so that the auto-zooming function for changing between different fixed paper sizes can proceed.

However, because the above-mentioned edge detectors of the photocopier are located at different predetermined and fixed positions that correspond to the specific paper sizes, said photocopier, therefore, can only zoom in or zoom out between the respective fixed paper sizes. If, occasionally, the object on the flat glass platform does not belong to any of the paper sizes pre-defined and thus recognizable by the photocopier, or if the object or the document is placed out of bound of the recommended position, then the edges of the object cannot be determined for a correct selection of the paper sizes, which would inevitably hampers the success of the auto-zooming function. Obviously, the aforementioned auto-zooming function used in a conventional photocopier cannot suitably satisfy the requirements of an automatic edge-detecting scanner capable of auto-zooming an object or a document of arbitrary paper size to a document of fixed paper size such as the A4 or B5 size.

SUMMARY OF THE INVENTION

Therefore, it is an object of the present invention is to provide an improved scanner with automatic edge detection capable of quickly and accurately detecting the size of an object placed on the glass platform thereof without the assistance of a computer and a monitor. In particular, the scanner according to the present invention is capable of obtaining the correct size of the object being scanned without restricting the size of the object to match any of the fixed paper sizes in order for such scanner function as auto zooming to proceed successfully.

The present invention achieves the above-indicated objects by providing a scanner with automatic edge detection comprising a main body, a scanning module, and an edge detector. Wherein, the main body includes a flat glass platform for supporting an object to be scanned. The scanning module is installed inside the main body for scanning the object disposed on said glass platform. The edge detector is also installed inside the main body for detecting any edge of the object along a first track.

Accordingly, the first major advantage of using the scanner according to the present invention is that the actual size of the scanned object is quickly and automatically detected by the edge detector installed inside the main body. The edge detector is capable of detecting the edges of the scanned object through quick movements along the first track, or a plurality of edge detectors are fixed inside the main body at locations where the edges of the objects are most likely to be detected. Thus, the size of an object within the scanning range of the scanner is quickly and automatically determined by detecting the edges of the object according to the present invention.

The second major advantage of using the scanner according to the present invention is that, through a microprocessor and a properly embedded computer program, the scanner according to the present invention is capable of auto zooming on the scanned object without the assistance of a computer and a monitor. It means that the scanner according to the present invention is a stand-alone scanning unit capable of saving the overall operating cost.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 1b shows the top view of the same scanner shown in FIG. 1a;

FIG. 2b is a top view of the scanner shown in FIG. 2a;

FIG. 3a is a cross-sectional view of the scanning module and the edge detector shown in FIG. 2a;

FIG. 3b shows another cross-sectional view of the scanning module and the edge detector shown in FIG. 2a;

FIG. 4b is a top view of the scanner shown in FIG. 4a; and

DETAILED DESCRIPTION OF THE PREFERRED EMBODIMENTS

Figure 1A:
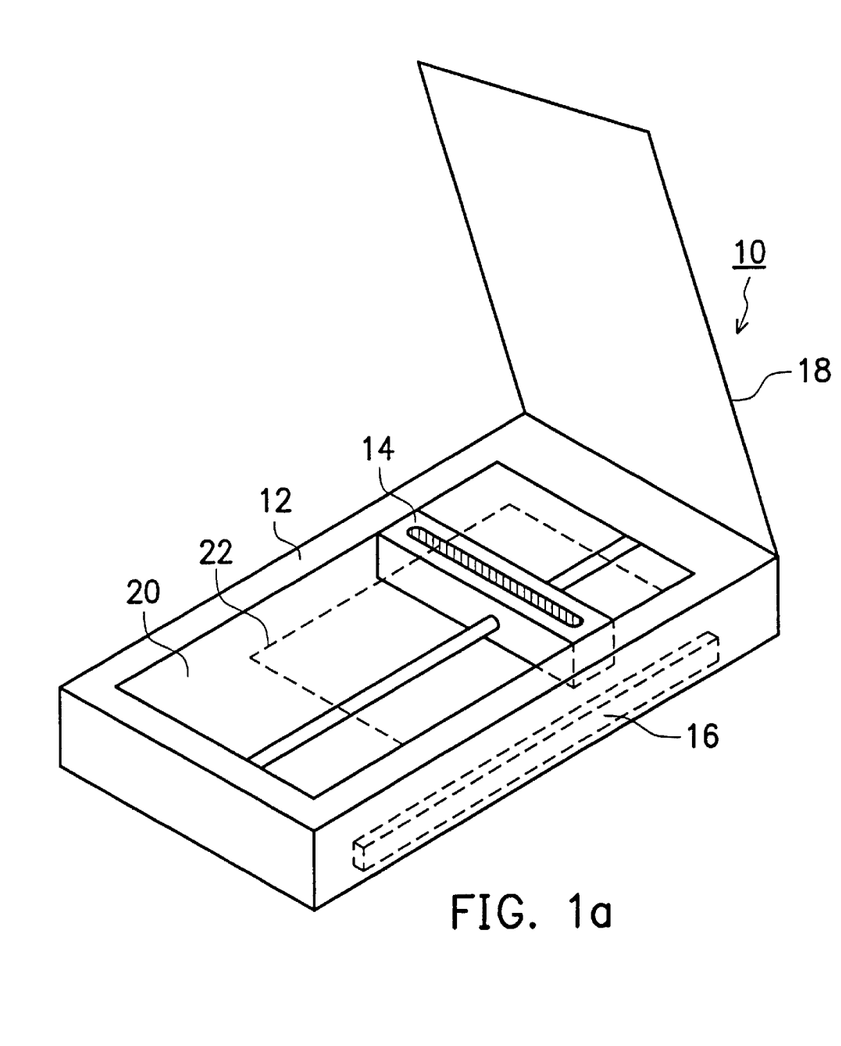
FIG. 1a is a perspective view of a scanner which illustrates the first embodiment of the present invention.
Figure 1B:
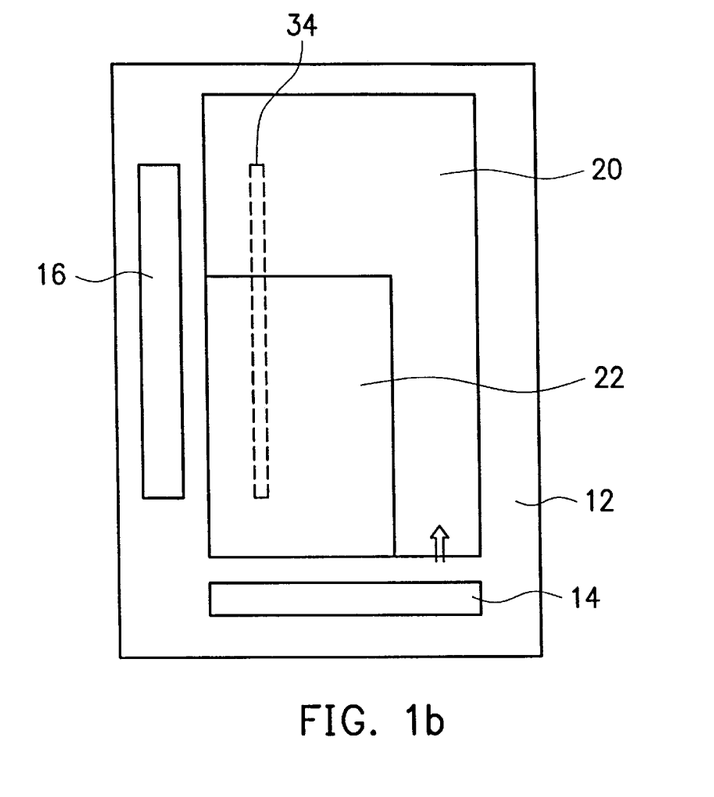
Figure 1C:
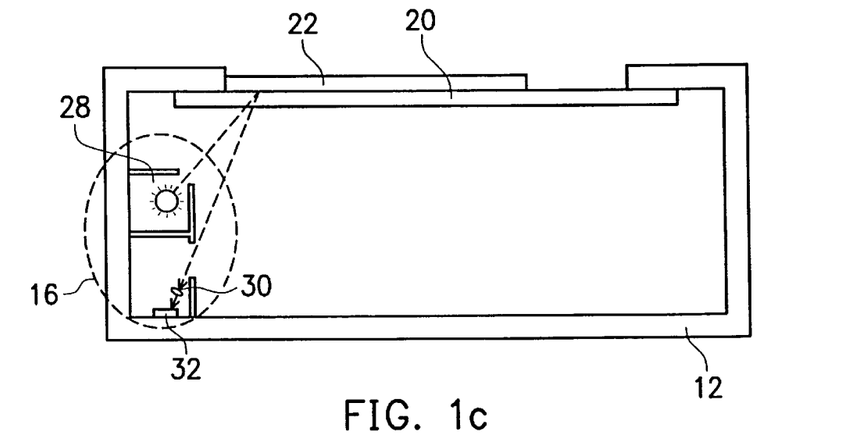
FIG. 1c is a cross-sectional diagram of the scanner shown in FIG. 1b.

Referring to FIG. 1a through FIG. 1c, FIG. 1a is a perspective view of a scanner which illustrates the first embodiment of the present invention; FIG. 1b shows the top view of the same scanner shown in FIG. 1a; and FIG. 1c is a cross-sectional diagram of the scanner shown in FIG. 1b. Accordingly, the present invention provides a scanner 10 capable of automatic edge detection, comprising a main body 12, a scanning module 14, an edge detector 16, and a cover 18. Wherein, the main body 12 includes a flat glass platform for supporting an object such as a paper, a book, or a drawing etc. to be scanned. Nonetheless, a paper 22 is given hereinafter as an example of the object to be scanned. Furthermore, said scanning module 14 is installed inside the main body 12 to be able to move along a first track in a linear direction as indicated by the arrow shown in FIG. 1b so as to scan the paper 22 disposed on the flat glass platform 20. Said edge detector 16 having its longitudinal side paralleled to the first track is also installed inside the main body 12, as shown in FIG. 1b. The edge detector 16 is fixedly installed in a region 34 where the edges of the paper 22 are most likely to be located. Said cover 18 is rotatably connected to the main body 12 to be switched between an open position and a closed position such that in the closed position the paper 22 is covered by the cover 18 while being scanned.

There are at least three ways to determine the transverse length of the paper 22 after the longitudinal length of the paper 22 is detected by the edge detector 16 that is installed in the region 34. The first method is via the reference of a table that represents a list of longitudinal lengths and corresponding transverse lengths. Since most paper sizes are standardized such as the A4 or B5 size, for example, the transverse length of a paper can be found directly by the table once the longitudinal length is readily known. The second method is to set up another edge detector in the transverse direction to detect the transverse length of the paper 22. The third method is to utilize the scanning module 14 as the edge detector for detecting the transverse length of the paper to be scanned, which only scans a slim portion of the paper 22. The slim portion of the paper scanned is substantially perpendicular to the longitudinal direction. Since only a minimal amount of data are gathered from the slim portion of the paper, the total time required for obtaining the transverse length thus can be ignored.

Therefore, the size of the paper 22 is quickly and accurately determined by any one of the above-mentioned methods. The scanner module 14 of the scanner according to the present invention is then activated to acquire a detailed scan image of the paper. As far as the actual zooming operations are concerned a properly embedded computer program of a prior technology such as the disclosed Taiwan Patent NO. 311200 is implemented.

As shown in FIGS. 1b and 1c, the scanning module 14 and the edge detector 16 each operates independently Furthermore, the edge detector 16 includes a first light source 28, which is independent from the scanning module 14, as shown in FIG. 1c. Said first light source is a fluorescent tube for lighting up the paper 22 according to an embodiment of the present invention. The edge detector 16 further includes a set of lenses and an array of light sensors 32. The lenses are used to focus the light intensity about the paper 22 in the slim region 34 of the flat glass platform to be detected by the light sensors 32. The light sensors 32 then determine the edge of the paper 22 in the longitudinal direction according to the light intensity difference detected, which in turn obtain the longitudinal length of the paper 22.

Figure 3A:
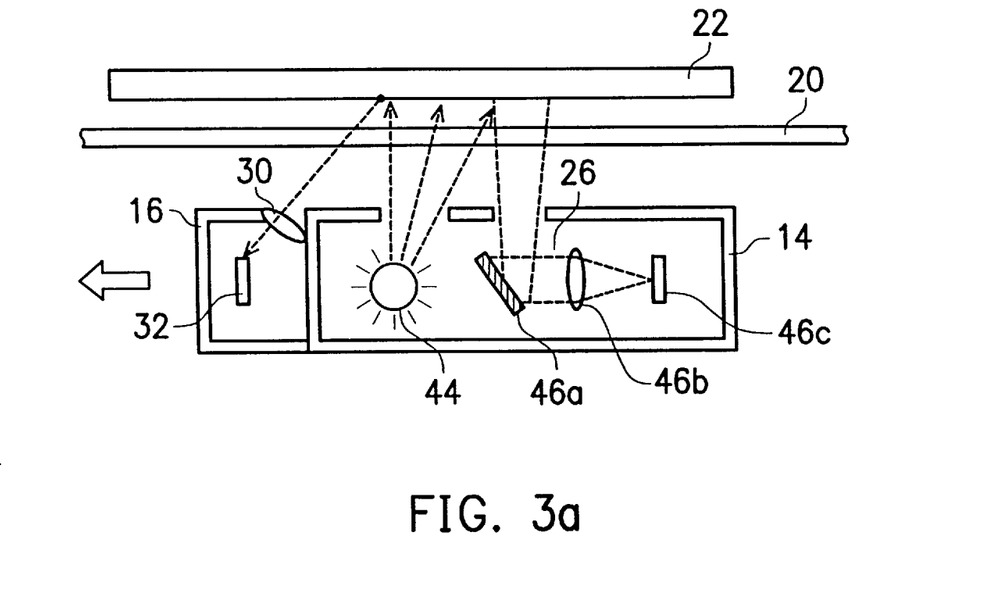

According to another embodiment of the present invention, the edge detector 16 can also work well without relying on the internally and independently operated first light source 28. Referring to FIG. 3A, a second light source 44 alone, which is installed in the scanning module 14, provides sufficient lighting to the normal operation of the edge detector 16. Accordingly, the image of the paper 22 can be detected by the light sensors 32 for determining the edge of the paper 22 in the longitudinal direction if the light intensity provided by the second light source 44 is sufficient. Moreover, any external light source such as the sunlight or the room lighting also can play a role as a light source for the normal operation of edge detection. The cover 18 of the scanner according to the present invention is first switched to the open position so that the edge detector 22 can detect the edges of the paper 22 on the flat glass platform by checking the light intensity difference.

Figure 2A:
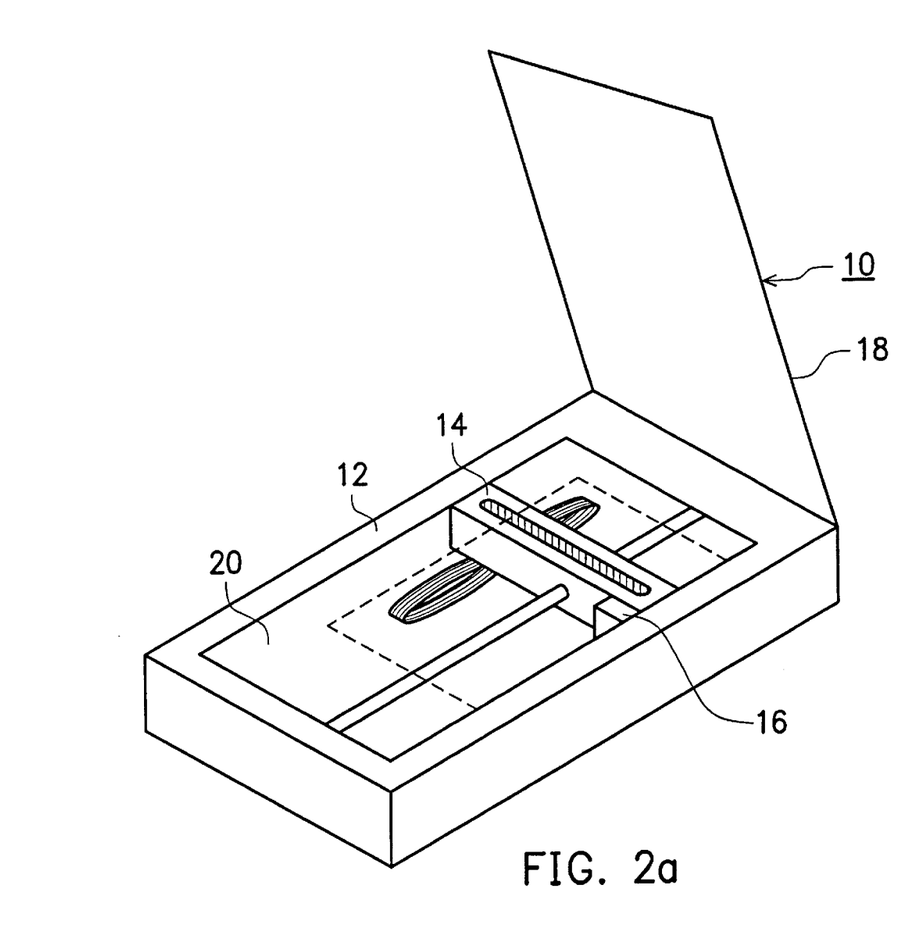
FIG. 2a is a perspective view of a scanner which illustrates the second embodiment of the present invention.
Figure 2B:
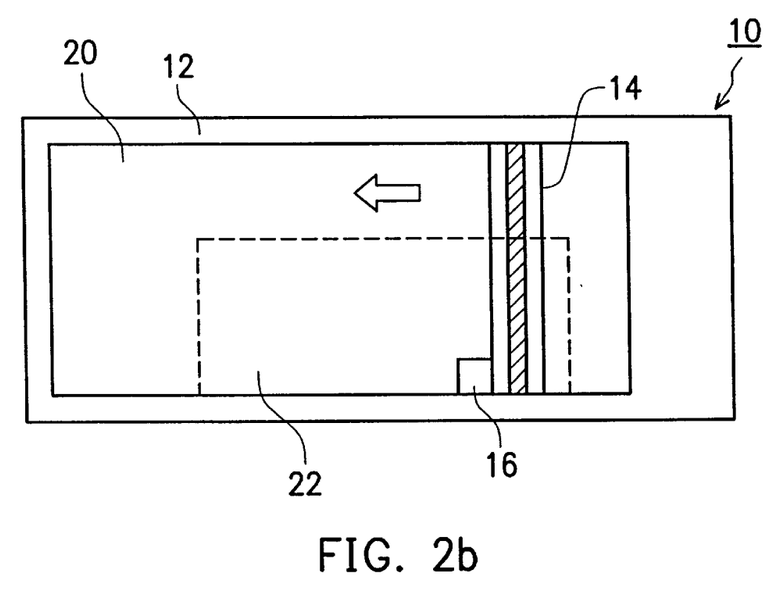

FIG. 2a is a perspective view of a scanner which illustrates the second embodiment of the present invention, and FIG. 2b is a top view of the scanner shown in FIG. 2a. The edge detector 16 is'slidably installed inside the main body 12 to be able to move in the longitudinal direction during operation as shown in FIGS. 2a and 2b. The edge detector 16 is fixedly attached to the scanning module 14 to be able to move together with the scanning module 14 according to this embodiment.

The edge detector 16 is provided with a light sensor 32 to sense the light intensity at a specific region (not shown) of the flat glass platform with respect to the edge detector 16, as shown in FIG. 3a. As mentioned above, there are three types of light sources which can be implemented for this purpose. They are the external light source, the light source installed by the edge detector, and the light source installed in the scanning module.

FIG. 3a is a cross-sectional view of the scanning module 14 and the edge detector 16 shown in FIG. 2a. The scanning module 14 according to this embodiment includes a second light source 44 and an image grabber 46. The second light source 44, for example, is a fluorescent tube used for lighting up the paper 22 on the flat glass platform as an image to be scanned in by the image grabber 46. The image grabber 46 comprises a reflective mirror 46a, a set of focus lenses 46b and an optical signal converter 46c to grab the image. If the edge detector 16 and the scanning module 14 both share a common light source such as the second light source 44 installed in the scanning module 14, the edge detector 16 requires a set of lenses, as shown in FIG. 3a, to focus the light intensity about the paper 22 on the flat glass platform to be detected by the light sensors 32.

Figure 3B:
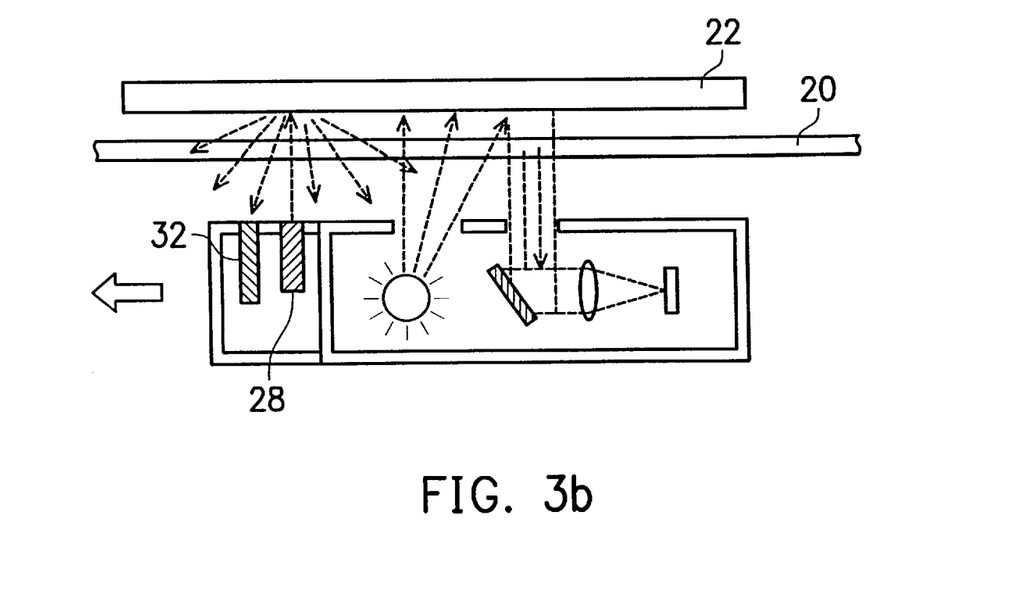

FIG. 3b shows another cross-sectional view of the scanning module 14 and the edge detector 16, which are shown in FIG. 2a, such that the edge detector 16 is provided with the first light source 28 for lighting up the paper 22 on the flat glass platform in addition to the second light source 44 of the edge detector 16. One candidate for the first light source 28 among others is a laser diode. As a result, the lenses in the edge detector 16 for focusing the light intensity of the second light source 44 is not required since the light sensors 32 is provided with sufficient light by the first light source 28 for detecting the light intensity difference, as shown in FIG. 3b.

Figure 4A:
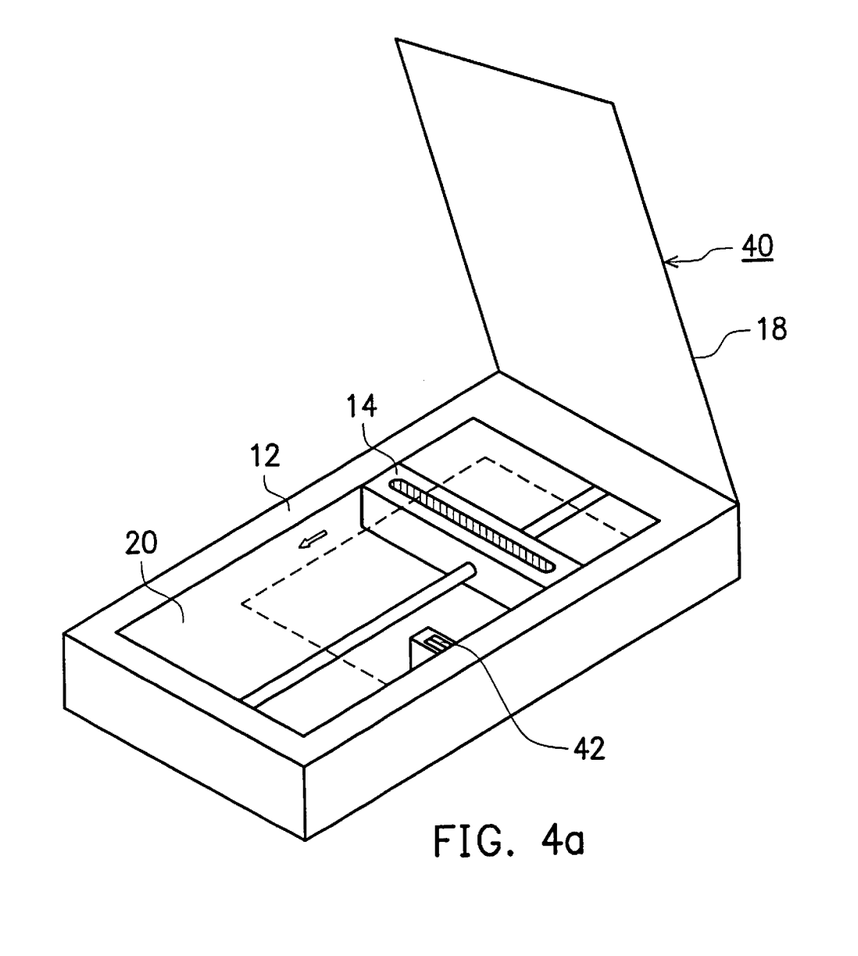
FIG. 4a is a perspective view of a scanner which illustrates/the third embodiment of the present invention.
Figure 4B:
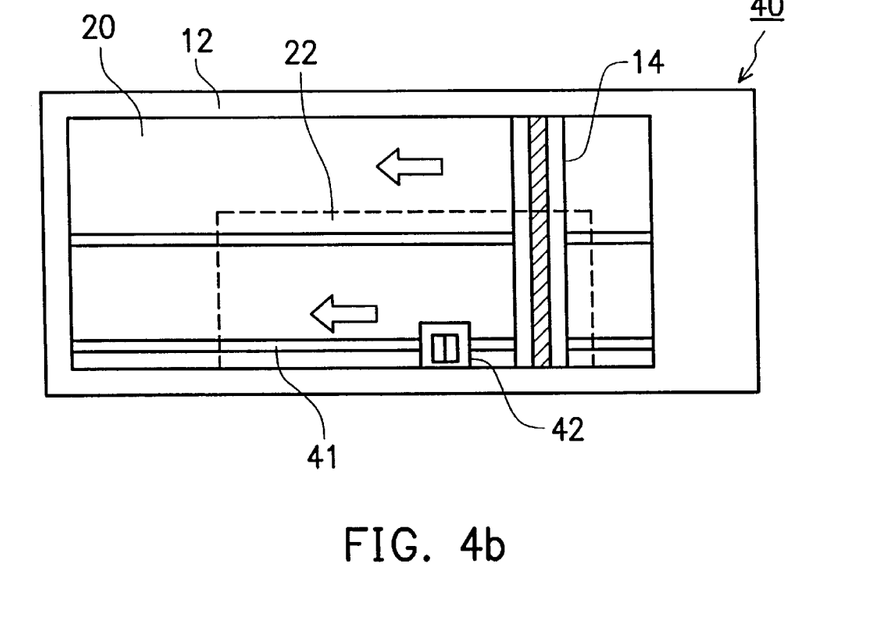

Referring to FIGS. 4a and 4b. FIG. 4a is a perspective view of a scanner which illustrates the third embodiment of the present invention, and FIG. 4b is a top view of the scanner shown in FIG. 4a. The scanning module 14 and the edge detector 42 each operates independently such that the movement of the scanning module 14 is independent of the movement of the edge detector 42 according to this embodiment. Said scanning module 14 and said edge detector 42 are both slidably installed in the main body to move along a first track and a second track (both not numerically indicated), respectively.

Said second track is typically comprised of a rail 41 which guides the movement of the edge detector 42 in the longitudinal direction. On the other hand, said first track may or may not be in parallel to the first track. The second track is typically positioned under the flat glass platform for detecting the edges of the paper 22 to be scanned.

Figure 5:
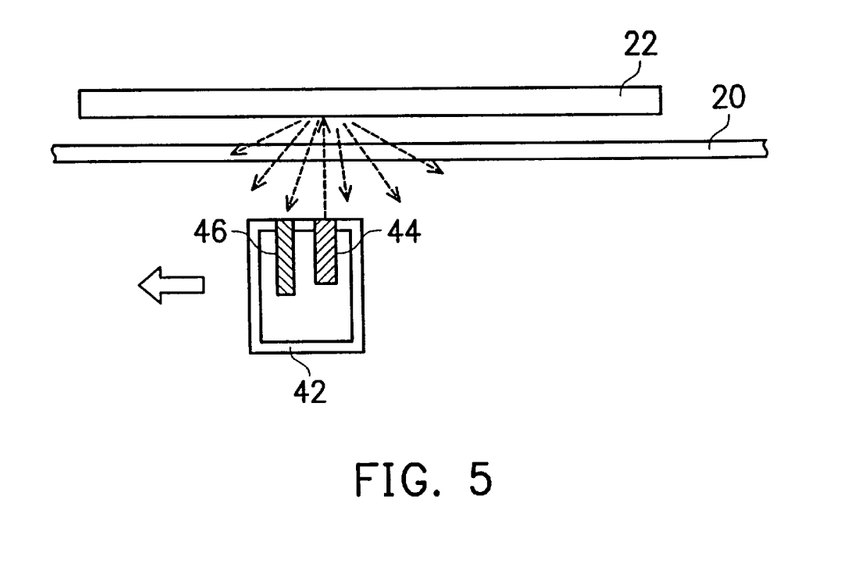
FIG. 5 is a cross-sectional view of the edge detector shown in FIG. 4a and FIG. 4b.

FIG. 5 is a cross-sectional view of the edge detector 42 shown in FIG. 4a and FIG. 4b. The edge detector 42 is provided with a first light source 44 and a light intensity sensor 46 as shown in FIG. 3b. The first light source 44 is comprised of a light-emitting device such as the laser diode for lighting up the paper 22 on the flat glass platform at a specific region (not shown) with respect to the rail 41 so that the light intensity difference in the region is detected by the light intensity sensor 46.

According to the present invention, the edges of an object on the flat glass platform is detected by the edge detector 42 in order to quickly and accurately obtain both the size and the position of the objection to be scanned. Alternatively, a scanner equipped with a CPU for controlling an external printer exclusive of a computer is a well-known technology, as disclosed by the Taiwan Patent No.311200; such a scanner is sold publicly. Hence, a combination of the above-mentioned technology according to the present invention, a scanner capable of stand-alone operation, and a printer connected to the scanner can achieve the function of auto-zooming, exclusive of a computer, to such fixed paper sizes as A3, A4, or B5 etc.

In comparison, a conventional scanner typically pre-scans an object to obtain a low-resolution, scanning image displayable on a computer monitor so that a choice is offered to the user for defining a specific region of the object to be scanned, zoomed, or processed by other special functions. The improved scanner according to the present invention, on the other hand, employs an edge detector to detect the edges of the object as well as the size of the object. Therefore, without the assistance of an external computer and a monitor, the scanner according to the present invention is capable of quickly and accurately detecting the edges of the object to be scanned and processed by a zoom-in or zoom-out function of the scanner. In particular, the object to be scanned by the scanner of the present invention is not required to be any of the fixed paper sizes for edge detection.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A scanner with automatic edge detection, comprising:

a main body having a first track and a flat glass platform for supporting an object;

a scanning module disposed inside the main body and moved along the first track for scanning an object; and an edge detector disposed inside the main body and fixed in position with respect to the main body for detecting at least an edge of the object placed on the flat glass platform, the edge detector comprising a longitudinal side parallel to the first track.

2. The scanner as claimed in claim 1, wherein the edge detector further comprises a plurality of sensors for detecting the light intensity difference about the object to be scanned through the flat glass platform.

3. The scanner as claimed in claim 1, wherein the edge detector further comprises a first light source for lighting up the objects on the flat glass platform.

4. The scanner as claimed in claim 1, wherein the scanning module comprises:

a second light source for lighting up the object on the flat glass platform to be scanned by the scanning module; and an image detector for detecting the image of the object.

5. The scanner as claimed in claim 4, wherein the second light source is a fluorescent tube.

6. The scanner as claimed in claim 1, wherein the scanner further comprises a cover rotatably connected to the main body for covering the object on the flat glass platform while being scanned.

7. A scanner with automatic edge detection, comprising:
a main body having a flat glass platform for supporting an object;
a scanning module disposed inside the main body for scanning the image of an object; and
an edge detector disposed inside the main body for detecting at least an edge of the object placed on the flat glass platform, wherein the scanning module and the edge detector are both housed in the main body and the movements thereof are separately guided by a first track and a second track, respectively.

8. The scanner as claimed in claim 7, wherein the edge detector comprises a light intensity detector for detecting the light intensity difference about the object on the flat glass platform to be scanned.

9. The scanner as claimed in claim 8, wherein the edge detector comprises a first light source for edge detection of the object placed on the flat glass platform of the scanner.

10. The scanner as claimed in claim 9, wherein the first light source is a laser diode.

* * * * *